(12) United States Patent
Wheeler et al.

(10) Patent No.: US 7,868,514 B2
(45) Date of Patent: Jan. 11, 2011

(54) PLURAL ROTOR PERMANENT MAGNET ELECTRIC MOTOR WITH COINCIDENT ELECTROMAGNETIC AXIS

(75) Inventors: Kenny L. Wheeler, Burt, MI (US);
Timothy P. Wheeler, Burt, MI (US);
Brett D. Mattison, Oakley, MI (US);
James G. Thorp, Saginaw, MI (US)

(73) Assignee: TWM Technology, L.L.C., Saginaw, MI (US)

( * ) Notice: Subject to any disclaimer, the term of this patent is extended or adjusted under 35 U.S.C. 154(b) by 553 days.

(21) Appl. No.: 11/891,744

(22) Filed: Aug. 13, 2007

(65) Prior Publication Data
US 2008/0143206 A1 Jun. 19, 2008

Related U.S. Application Data

(60) Provisional application No. 60/875,654, filed on Dec. 19, 2006.

(51) Int. Cl.
*H02K 21/24* (2006.01)
(52) U.S. Cl. .................................. 310/268; 310/156.37
(58) Field of Classification Search ................. 310/268, 310/156.37
See application file for complete search history.

(56) References Cited

U.S. PATENT DOCUMENTS

| 1,566,693 | A | * | 12/1925 | Pletscher | 310/152 |
| 3,437,897 | A | * | 4/1969 | Lenny | 388/816 |
| 4,358,693 | A | * | 11/1982 | Palmer et al. | 310/46 |
| 5,258,697 | A | * | 11/1993 | Ford et al. | 318/498 |
| 5,455,474 | A | * | 10/1995 | Flynn | 310/181 |
| 5,768,645 | A | * | 6/1998 | Kessler | 396/376 |
| 5,982,058 | A | * | 11/1999 | Bustamante et al. | 310/49.12 |
| 6,392,370 | B1 | | 5/2002 | Bedini | |
| 6,445,105 | B1 | * | 9/2002 | Kliman et al. | 310/268 |
| 6,849,984 | B2 | | 2/2005 | Gallant | |
| 7,049,724 | B2 | * | 5/2006 | Qu et al. | 310/180 |
| 7,095,193 | B2 | | 8/2006 | Kellogg et al. | |
| 7,105,972 | B2 | | 9/2006 | Gallant | |
| 2008/0143206 | A1 | * | 6/2008 | Wheeler et al. | 310/114 |

* cited by examiner

*Primary Examiner*—Karl I Tamai
(74) *Attorney, Agent, or Firm*—Timothy S. Stevens

(57) ABSTRACT

An electric motor having a first rotor, a second rotor and a third rotor, a first permanent magnet, a second permanent magnet and a third permanent magnet, a first stator and a second stator, a first electromagnet and a second an electromagnet with one end of the core larger than the other, a shaft, a shaft rotation position sensor and an electric switch.

1 Claim, 7 Drawing Sheets

US 7,868,514 B2

PLURAL ROTOR PERMANENT MAGNET ELECTRIC MOTOR WITH COINCIDENT ELECTROMAGNETIC AXIS

BACKGROUND OF THE INVENTION

This application claims the benefit of priority to U.S. Provisional Patent Application Ser. No. 60/875,654 filed Dec. 19, 2006. The instant invention relates to a permanent magnet electric motor. Permanent magnet electric motors are well known in the art and are available in many unique variations. The commutator system of a permanent magnet electric motor can be replaced by a position sensor/solid state switch system to produce the well known "brushless" motor. U.S. Pat. No. 6,849,984 discloses a permanent magnet electric motor having permanent magnets mounted in a rotor and electromagnets positioned adjacent the face of the rotor.

Despite the significant improvements that have been made in the field of electric motors, there remains a need for additional improvements to such motors.

SUMMARY OF THE INVENTION

The instant invention is an electric motor, comprising a first rotor, a second rotor, a first permanent magnet, a second permanent magnet, a stator, an electromagnet, a shaft, a shaft rotation position sensor and an electric switch, the first rotor being mounted on the shaft, the second rotor being mounted on the shaft and separated from the first rotor by the stator, the first permanent magnet being located in the first rotor, the second permanent magnet being located in the second rotor, the north south orientation of the first permanent magnet being the same as the north south orientation of the second permanent magnet, the north south axis of the first and second permanent magnets each being spaced radially from the longitudinal axis of the shaft, the north south axis of the first and second permanent magnets each being about parallel with the longitudinal axis of the shaft, the north south axis of the first permanent magnet being spaced rotationally from the north south axis of the second permanent magnet, the electromagnet being located in the stator so that when the electromagnet is energized the north south axis of the electromagnet is about parallel with the longitudinal axis of the shaft and spaced radially from the longitudinal axis of the shaft, the shaft rotation position sensor being positioned to sense the rotation position of the shaft so that the electromagnet can be energized by way the electric switch at a rotation position of the shaft when the first, the second or both the first and second permanent magnets are near the electromagnet to cause the shaft to rotate.

DETAILED DESCRIPTION

Figure 1:
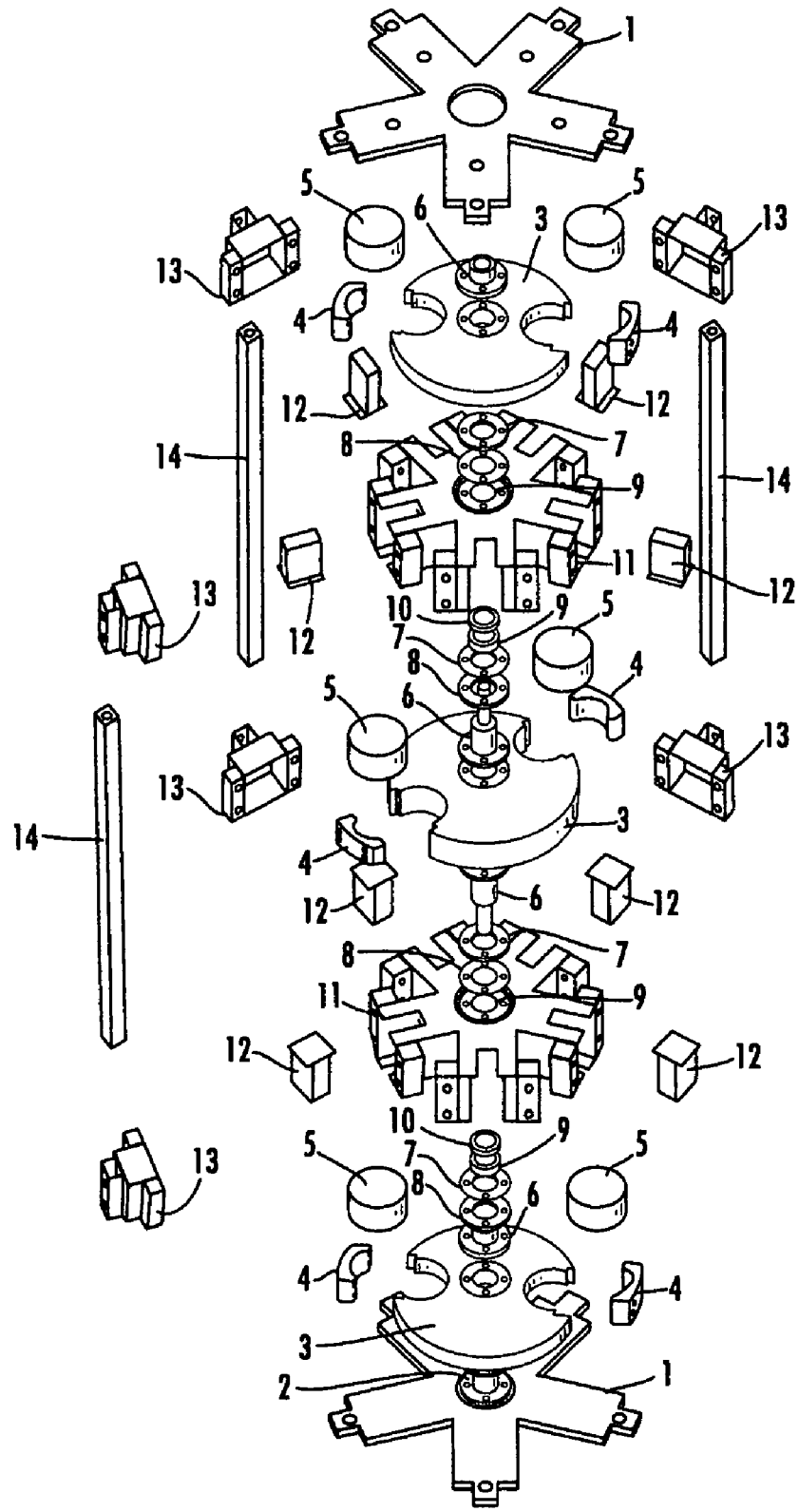
FIG. 1 is an exploded view of a portion of an electric motor embodiment of the instant invention.
Figure 8:
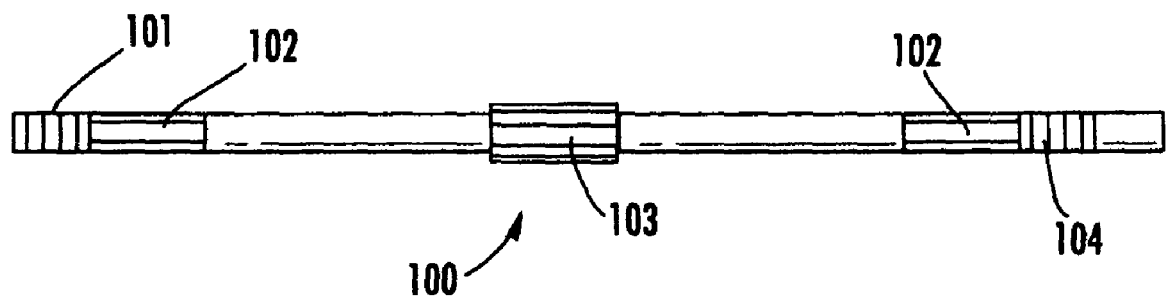
FIG. 8 is a side view of the shaft to be used with the motor of FIG. 1.

Referring now to FIG. 1, therein is shown an exploded view of a portion of an electric motor embodiment of the instant invention laid out along the longitudinal axis of a shaft (shown in FIG. 8). Shaft bearing mounts 1 are used to support shaft bearings 9. Rotor adapters 2 are attached to the rotors 3. Rotors 3 are preferably made of a nonmagnetic material such as glass fiber reinforced polycarbonate polymer. Permanent magnets 5 are mounted in the rotors 3 and held in place by magnet caps 4. Splined attachment hubs 6 are attached to rotors 3 for receiving a splined portion of the shaft. Shaft bearing retainer plates 7 and gaskets 8 are used to retain the bearings 9 in position. Shaft oil seals 10 retains lubricant in bearings 9. Electromagnets 12 (only the iron core of the electromagnets is shown and not the winding of copper magnet wire around the core, the winding being potted in a thermoset polymer) are mounted in stators 11 and retained by electromagnet caps 13. Shaft bearing mounts 1 are attached to main housing retainer rails 14. The north south orientation of the permanent magnets 5 are all the same and are about parallel with the longitudinal axis of the shaft. The north south axis of the permanent magnets of the outer rotors are spaced rotationally from the north south axis of the permanent magnets of the central rotor. The electromagnets 12 are located in the stator so that when the electromagnets are energized the north south axis of the electromagnets 12 are about parallel with the longitudinal axis of the shaft. A shaft rotation position sensor (described in detail below) is positioned to sense the rotation position of the shaft so that specific electromagnets 12 can be energized by way of the an electric switch at a rotation position of the shaft when specific permanent magnets 5 are near the energized electromagnets 12 to cause the shaft to rotate.

Figure 2:
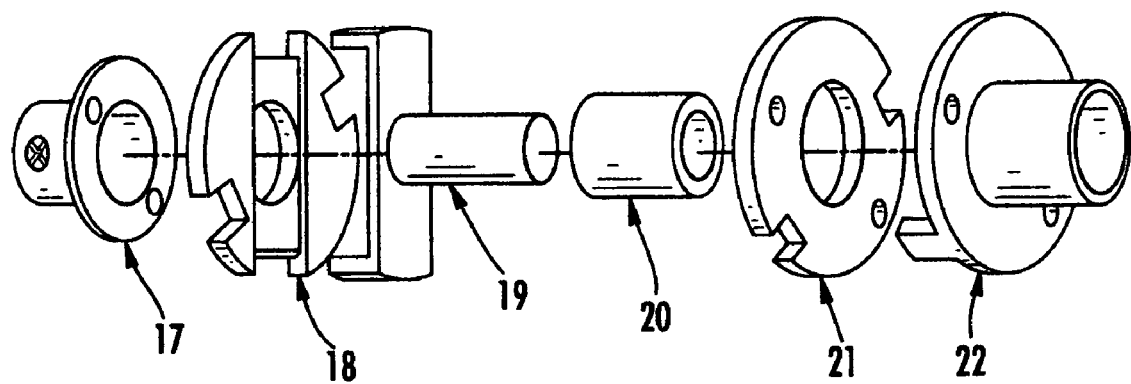
FIG. 2 is an exploded view of a commutator and slip ring portion of an electric motor embodiment of the instant invention.

Referring now to FIG. 2, therein is shown an exploded view of a commutator and slip ring portion of the electric motor embodiment of FIG. 1 including commutator retainer 17 which is attached at end of the shaft of the motor by way of a set screw. Positive copper commutator/slip ring 22 engages with first plastic insulator spacer ring 21, over plastic insulator tube 20, over copper negative commutator/slip ring 19 which engages with second plastic insulator spacer ring 18, the whole assembly being attached to the retainer 17. Five brushes (not shown in FIG. 2 but shown as elements 23, 24, 25, 26 and 27 in FIG. 3) are arranged in a symmetric manner radially of and in contact with the commutator while two brushes (not shown in FIG. 2 but shown as elements 19a and 22a in FIG. 3) are in contact with the extended cylindrical slip ring portions of the negative and positive commutator portions 19 and 22.

Figure 3:
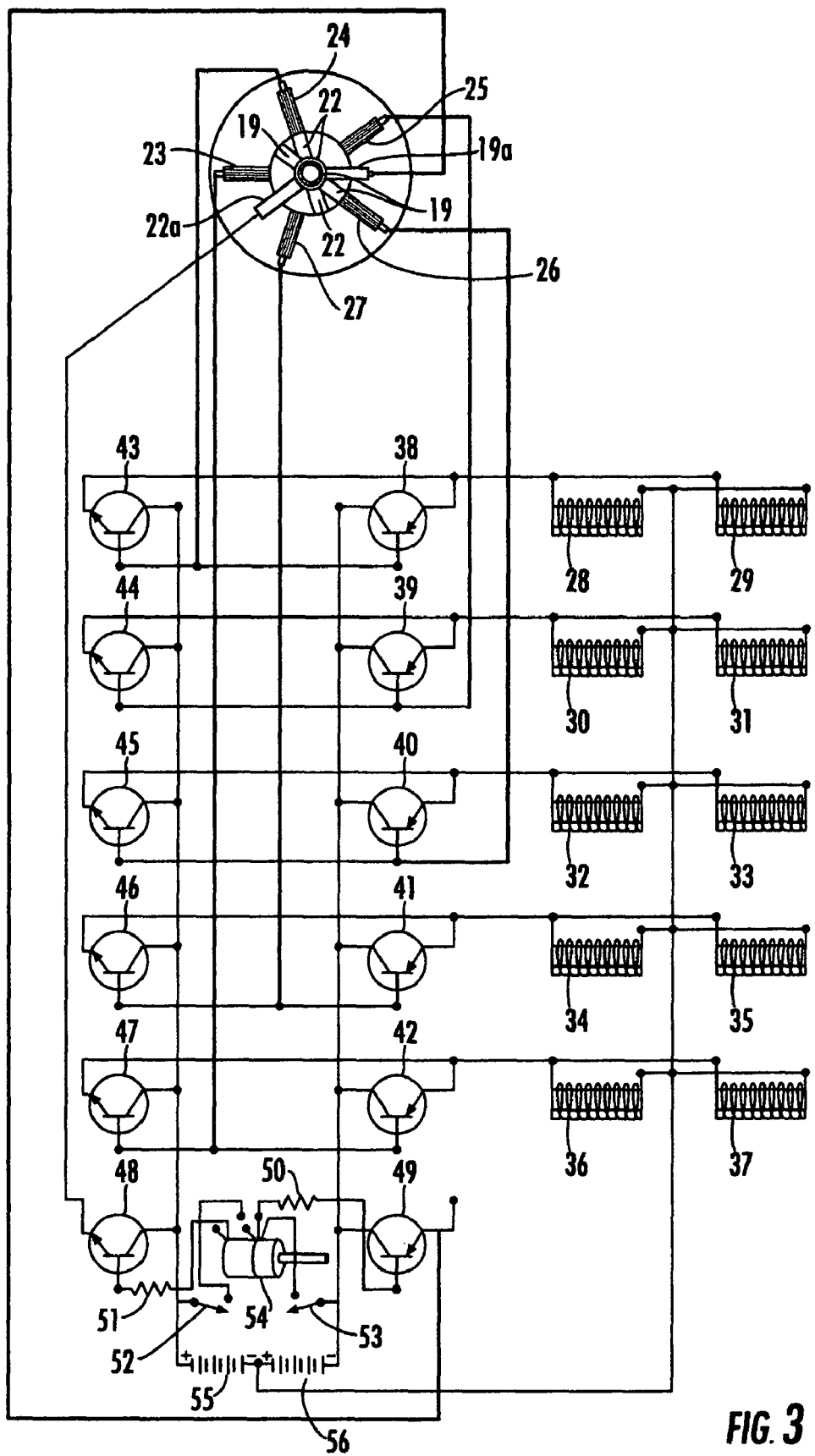
FIG. 3 is a schematic view of a power transistor switching circuit of an electric motor embodiment of the instant invention.

Referring now to FIG. 3, therein is shown a schematic view of a power transistor switching circuit of the electric motor embodiment of the instant invention of FIGS. 1 and 2. The power transistor switching circuit includes: NPN power transistors 43, 44, 45, 46, 47 and 48; PNP power transistors 38, 39, 40, 41, 42 and 49; electromagnet coils 28, 29, 30, 31, 32, 33, 34, 35, 36 and 37; a dual 500,000 ohm potentiometer 54; switches 52 and 53; 1,000 ohm resistors 50 and 51; and batteries 55 and 56. The use of the transistor switching circuit significantly reduces the current carried by the brushes. However, it should be understood that a transistor (or other solid state) switching system is not required in the instant invention. Furthermore, the shaft rotation position sensing means is not limited to a commutator but can be any suitable means such as a hall effect sensor or an optical system. Thus, the motor of the instant invention can be of the "brushless" type or the brush type or a hybrid system.

Referring again to FIG. 1, preferably the one north south end of the core of the electromagnets 12 is larger than the other north south end of the core of the electromagnet with the larger ends facing the central rotor. The degree of rotational off-set of the permanent magnets of the central rotor relative to the permanent magnets of the outer rotors is preferably such that when the north south axis of the permanent magnets of the outer rotors are aligned with the north south axis of an aligned pair of energized electromagnets in the stator, the north south axis of the permanent magnet in the central rotor is aligned with the edge of the cores of said electromagnets. Most preferably, the core of the electromagnets at their cross-sectioned mid-section is a rectangle twice as deep as it is wide while the enlarged end of the cores is a square as shown in detail in FIG. 10.

It should be understood that the motor of the instant invention can be operated in unipolar or bipolar manner. It should be understood that the motor of the instant invention can be used as an electrical generator when the shaft thereof is driven. The motor of the instant invention can even be operated as both a motor and a generator at the same time by positioning a pick-up coil(s) near the rotor or by using a portion of the electromagnets as a pick-up coil(s). It should be understood that although FIG. 1 shows five electromagnets mounted in each stator, any number of electromagnets (that fit in relation to the permanent magnets) can be used in a stator the instant invention. Preferably, an odd number (such as 3, 5, 7 or 9) of electromagnets are used in each stator of the instant invention.

Figure 4:
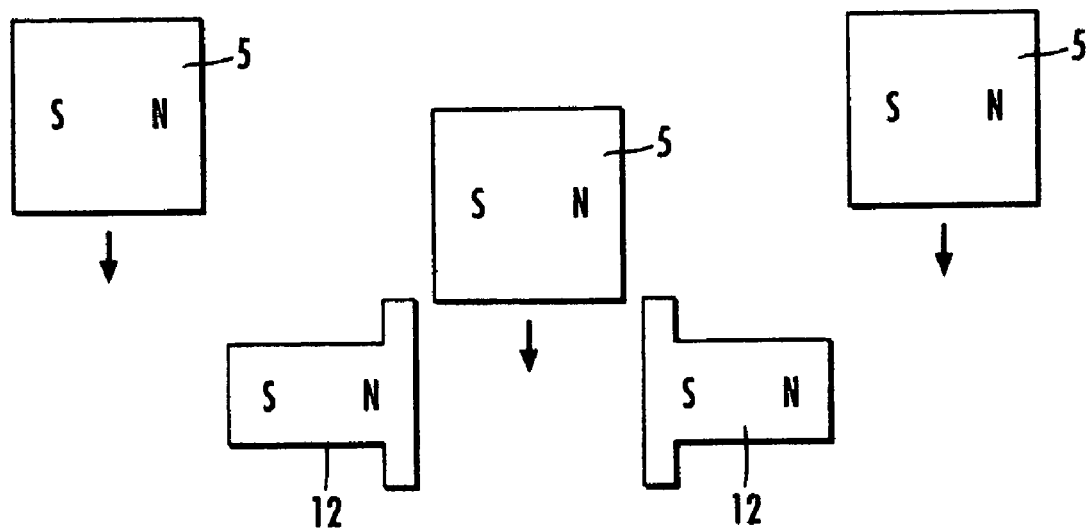
FIG. 4 is a schematic view of the interaction of the permanent magnets and electromagnets of the embodiment shown in FIG. 1 as the permanent magnets rotate toward the electromagnets.

Referring now to FIG. 4, therein is shown a schematic view of the interaction of the permanent magnets 5 and electromagnets 12 of the embodiment shown in FIG. 1 as one set of the permanent magnets 5 rotate toward one set of the energized electromagnets 12 in the direction shown by the arrows in response to the attraction between the permanent magnets 5 and the energized electromagnets 12.

Figure 5:
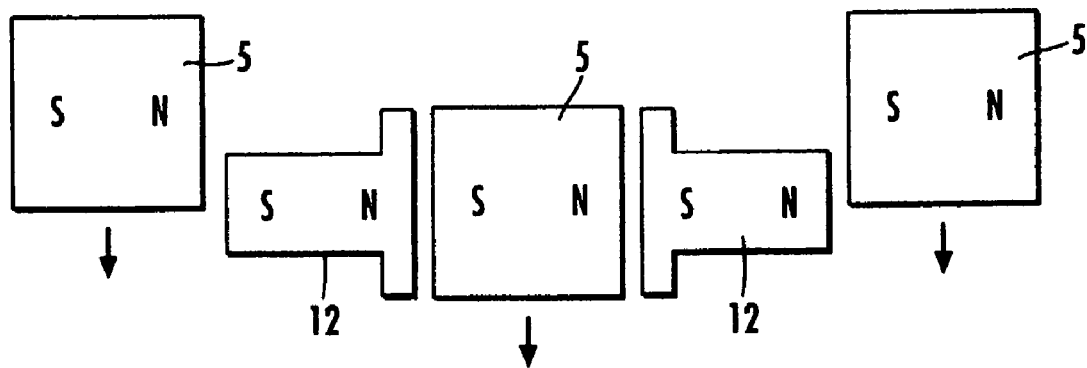
FIG. 5 is a schematic view of the interaction of the permanent magnets and electromagnets of FIG. 4 as the permanent magnets rotate near the position where the polarity of the electromagnets are reversed.

Referring now to FIG. 5, therein is shown a schematic view of the interaction of the permanent magnets 5 and electromagnets 12 of the embodiment shown in FIG. 4 as the permanent magnets 5 rotate further toward the energized electromagnets 12 in the direction shown by the arrows in response to the attraction between the permanent magnets 5 and the energized electromagnets 12.

Figure 6:
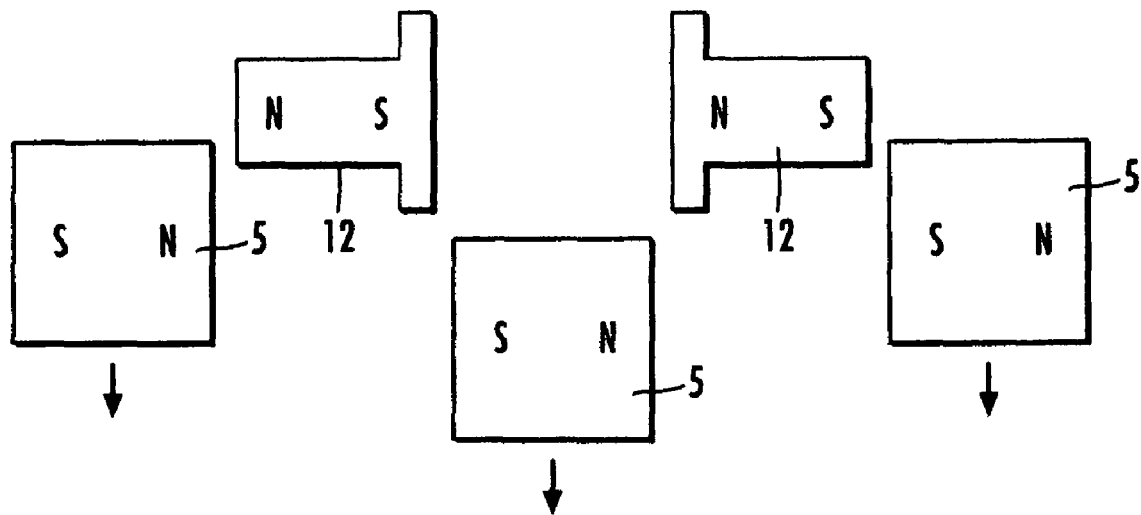
FIG. 6 is a schematic view of the interaction of the permanent magnets and electromagnets of FIG. 5 as the permanent magnets rotate past the position where the polarity of the electromagnets are reversed.

Referring now to FIG. 6, therein is shown a schematic view of the interaction of the permanent magnets 5 and electromagnets 12 of the embodiment shown in FIG. 5 as the permanent magnets 5 rotate away from the reverse energized electromagnets 12 in the direction shown by the arrows in response to the repulsion between the permanent magnets 5 and the reverse energized electromagnets 12.

Figure 7:
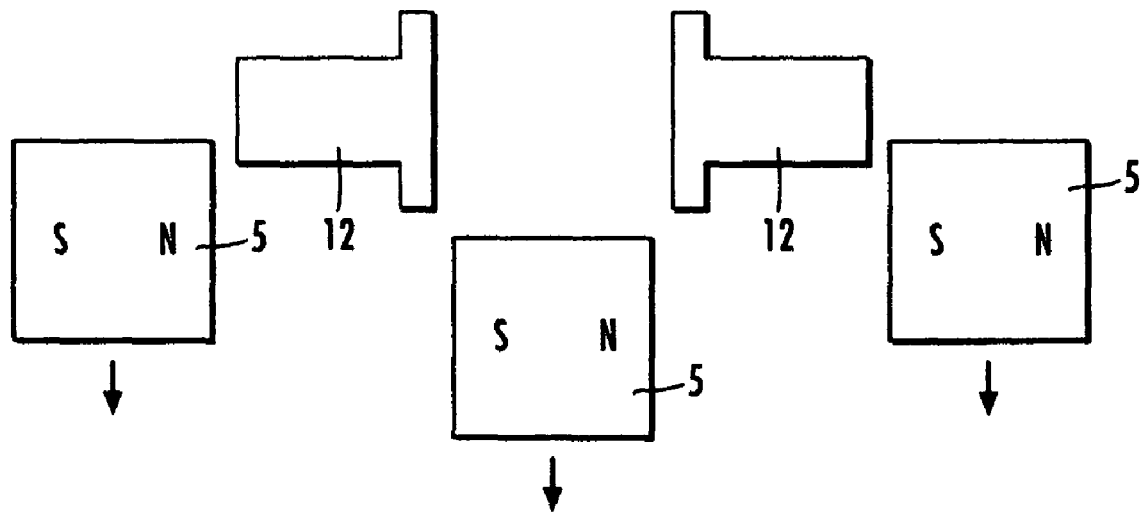
FIG. 7 is a schematic view of the interaction of the permanent magnets and electromagnets of FIG. 6 as the permanent magnets rotate past the position where the electromagnets are not energized.

Referring now to FIG. 7, therein is shown a schematic view of the interaction of the permanent magnets 5 and electromagnets 12 of the embodiment shown in FIG. 6 as the permanent magnets 5 rotate away from the non-energized electromagnets 12 in the direction shown by the arrows.

The embodiment depicted in FIGS. 4-7 is an example of the bipolar operation of the motor of FIG. 1. If the electromagnets 12 in FIGS. 4-7 were not reverse energized (and non-energized in FIGS. 6 and 7), then the motor of FIG. 1 would have been operated in a unipolar "pull only" manner. And, if the electromagnets 12 in FIGS. 4-7 were only reverse energized (and non-energized in FIGS. 4 and 5), then the motor of FIG. 1 would also have been operated in a unipolar "push only" manner. FIGS. 4-7 show only one set of the five sets of electromagnets of the motor of FIG. 1 and only one set of the opposed sets of permanent magnets. The commutator and slip ring system shown in FIGS. 2 and 3 provides the rotation position sensing and switching for all sets of the electromagnets relative to all sets of the permanent magnets of the motor.

Figure 9:
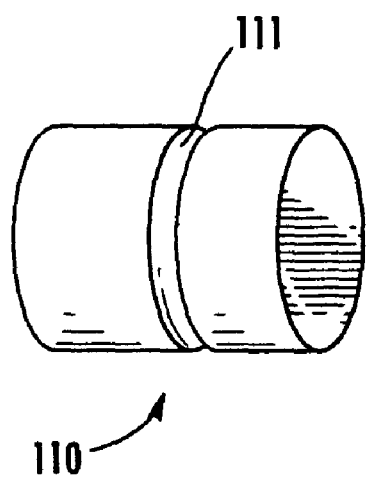
FIG. 9 is an enlarged view of a permanent magnet to be used with the motor of FIG. 1, the permanent magnet having a retaining groove therein.
Figure 10:
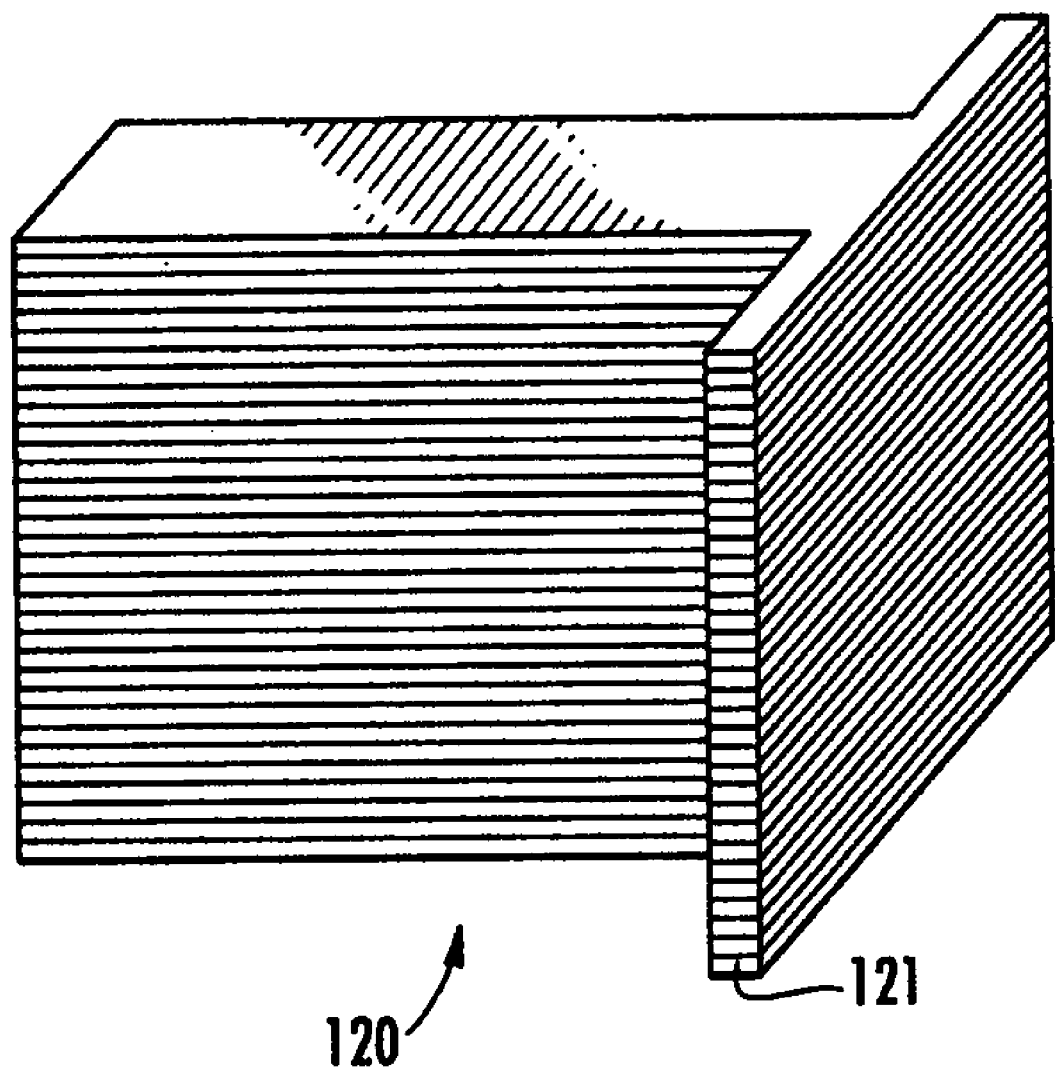
FIG. 10 is an enlarged view of an electromagnet core to be used with the motor of FIG. 1 showing its laminated structure.

Referring now to FIG. 8, therein is shown a side view of the shaft 100 to be used with the motor of FIG. 1. The shaft 100 has a central splined portion 103 as well as splined portions 102 positioned near the ends of the shaft 100. The shaft 100 also has threaded portions 101 positioned near the ends of the shaft 100. Referring now to FIG. 9, therein is shown a detailed side perspective view in full of one of the permanent magnets 110 to be used in the motor of FIG. 1. The permanent magnet 110 is a three inch diameter neodynimun type that has a retaining groove 111. The retaining groove 111 engages a ridge machined in the rotors and magnet caps the of the motor. Referring now to FIG. 10, therein is shown an enlarged view of one of the electromagnet cores 120 to be used with the motor of FIG. 1. The core 120 is made of 48 layers of 1/16 inch thick iron layers 121. One end of the core 120 has a square shape three inches on a side. The other end of the core 120 has a rectangle shape three inches by one and one half inches. The edges of the core 120 are rounded with a radius of about 1/32 inch. The core 120 is wound with 12 gauge copper magnet wire potted in thermoset resin.

The electromagnet(s) of the instant invention can be cooled to increase the maximum sustained power of the motor of the instant invention. For example, a motor of the instant invention used to propel a vehicle such as an automobile can be cooled by the air conditioning system of the automobile. Preferably such cooling is sufficient to cause the electromagnet(s) to become a superconducting electromagnet(s).

It should be understood that the motor of the instant invention can be modified to run on alternating current by connecting the electromagnet(s) to alternating current and eliminating the shaft rotation position sensor and an electric switch. Such modified motor is hereby included within the broad scope of the instant invention. Such modified motor has a speed dependent on the frequency of the alternating current. Of course, such modified motor preferably has additional permanent magnets mounted in the rotors in the same manner as the original permanent magnets since all of the electromagnets are being energized at the same time by the alternating current. Furthermore, it should be understood that it is equivalent in the instant invention to mount the permanent magnets in a stator(s) while the electromagnets are mounted in the rotor(s). However, such an arrangement requires slip rings and brushes to energize the electromagnets and thus such an arrangement is not preferred.

CONCLUSION

While the instant invention has been described above according to its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains and which fall within the limits of the following claims.

What is claimed is:

1. An electric motor, comprising a first rotor, a second rotor and a third rotor, a first permanent magnet, a second permanent magnet and a third permanent magnet, a first stator and a second stator, a first electromagnet and a second electromagnet, a shaft, a shaft rotation position sensor and an electric switch, the first rotor being mounted on the shaft, the second rotor being mounted on the shaft and separated from the first rotor by the first stator, the third rotor being mounted on the shaft and separated from the second rotor by the second stator, the first permanent magnet being located in the first rotor, the second permanent magnet being located in the second rotor, the third permanent magnet being located in the third rotor, the north south orientation of the first permanent magnet being the same as the north south orientation of the second and third permanent magnets, the north south axis of the first, second and third permanent magnets each being spaced radially from the longitudinal axis of the shaft, the north south axis of the first, second and third permanent magnets each being about parallel with the longitudinal axis of the shaft, the north south axis of the first and third permanent magnets being about coincident, the north south axis of the first permanent magnet being spaced rotationally from the north south axis of the second permanent magnet, the first electromagnet being located in the first stator so that when the first electromagnet is energized the north south axis of the first electromagnet is about parallel with the longitudinal axis of the shaft and spaced radially from the longitudinal axis of the shaft, the second electromagnet being located in the second stator so that when the second electromagnet is energized the north south axis of the second electromagnet is about parallel with the longitudinal axis of the shaft and spaced radially from the longitudinal axis of the shaft, the north south axis of the first and second electromagnets being about coincident and wherein one north south end of the core of each electromagnet is larger than the other north south end of the core of each electromagnet and wherein larger north south ends of each electromagnet are positioned to face each other, the shaft rotation position sensor being positioned to sense the rotation position of the shaft so that the first and second electromagnets can be energized by way the electric switch at a rotation position of the shaft when each of the first, second and third permanent magnets are near the first and second electromagnets to cause the shaft to rotate.

* * * * *